(12) United States Patent
Ilame et al.

(10) Patent No.: US 12,225,073 B2
(45) Date of Patent: Feb. 11, 2025

(54) UNIFIED CROSS-APPLICATION NAVIGATION AND ROUTING

(71) Applicant: ServiceNow, Inc., Santa Clara, CA (US)

(72) Inventors: Nisha Ilame, San Diego, CA (US); Vinay Sankarasetty, San Diego, CA (US); Jason Strimpel, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 60 days.

(21) Appl. No.: 17/872,826

(22) Filed: Jul. 25, 2022

(65) Prior Publication Data
US 2024/0031423 A1  Jan. 25, 2024

(51) Int. Cl.
*H04L 67/10* (2022.01)
*H04L 67/025* (2022.01)

(52) U.S. Cl.
CPC ............ *H04L 67/10* (2013.01); *H04L 67/025* (2013.01)

(58) Field of Classification Search
CPC .............................. H04L 67/10; H04L 67/025
USPC ......................................................... 709/201
See application file for complete search history.

(56) References Cited

U.S. PATENT DOCUMENTS

| | | | | |
|---|---|---|---|---|
| 2014/0337815 A1* | 11/2014 | Erlewein | ............. | G06F 8/30 717/106 |
| 2019/0065177 A1* | 2/2019 | Khoongumjorn | ......... | G06F 8/71 |
| 2022/0005558 A1* | 1/2022 | Malfait | ............... | G06F 16/2246 |
| 2023/0057135 A1* | 2/2023 | Hauck | ................. | G06F 3/04842 |
| 2023/0097739 A1* | 3/2023 | Fahrni | ............ | G06Q 10/063118 705/7.15 |

FOREIGN PATENT DOCUMENTS

WO   WO-2012028957 A2 *   3/2012   ........... G06Q 10/103

* cited by examiner

*Primary Examiner* — Suraj M Joshi
*Assistant Examiner* — Ayele F Woldemariam
(74) *Attorney, Agent, or Firm* — McDonnell Boehnen Hulbert & Berghoff LLP

(57) ABSTRACT

An online cloud application platform for global navigation of multiple online cloud-based applications is provided. The online cloud application platform is configured to provide a plurality of online cloud-based applications. While providing a current application among the plurality of online cloud-based applications, an event identifying a function request decoupled from a static navigation route is received via a cross-application routing handler. Based on a set of dynamically modifiable configuration data of the online cloud application platform, which application among the plurality of online cloud-based applications to handle the function request is dynamically determined. Based on the set of dynamically modifiable configuration data of the online cloud application platform, a corresponding dynamically determined cross-application navigation route to handle the event is determined. The dynamically determined cross-application navigation route is provided within a context of the current application among the plurality of online cloud-based applications.

17 Claims, 5 Drawing Sheets

UNIFIED CROSS-APPLICATION NAVIGATION AND ROUTING

BACKGROUND OF THE INVENTION

Increasingly, a user may use multiple online applications that provide different experiences simultaneously in a workflow. Typically, the different applications are independent from each other and must be run separately. Each of the applications has a different context. A user needs to switch between different applications manually and repeatedly, which is inefficient and inconvenient for the user.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
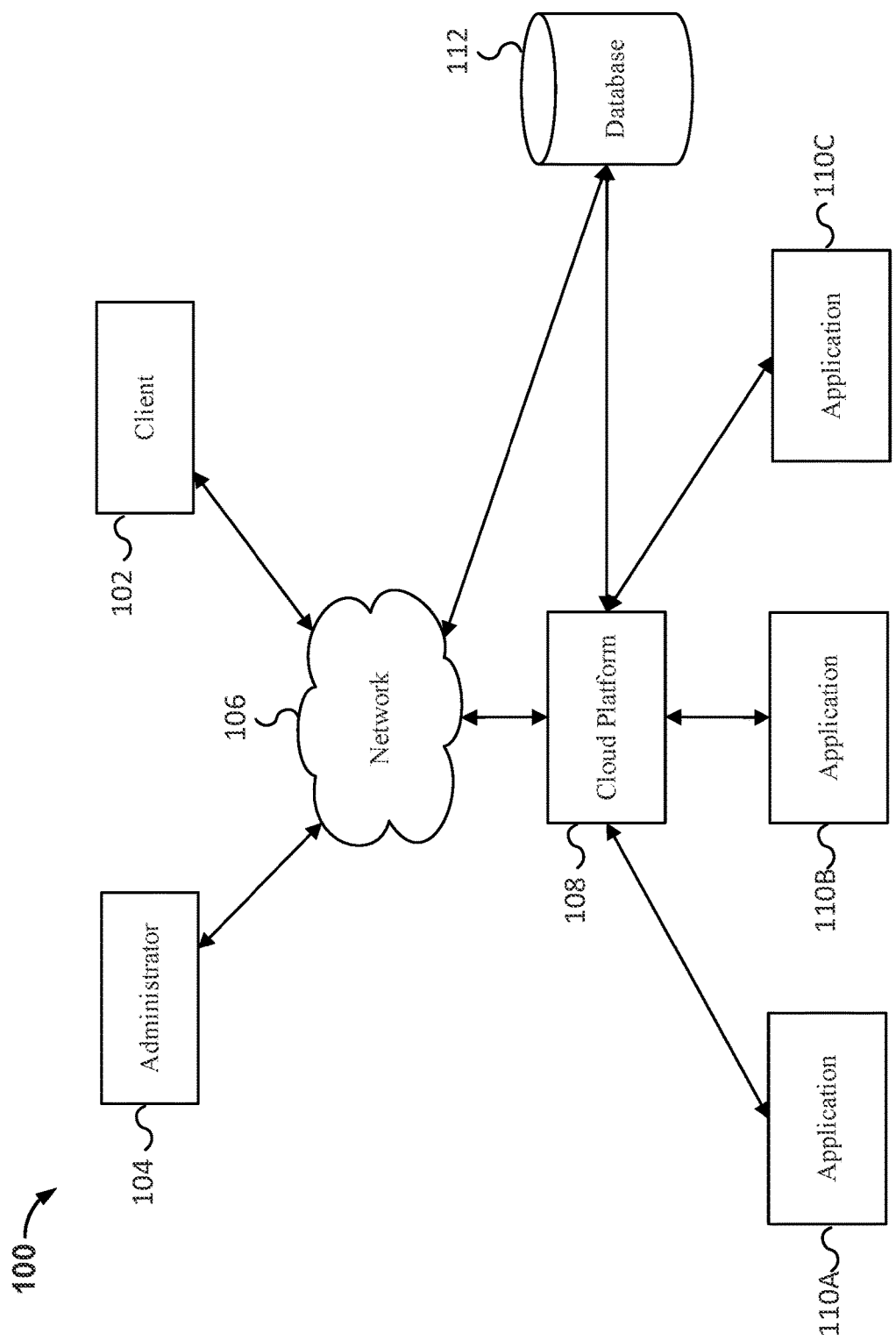
FIG. 1 is a block diagram 100 illustrating an example of a network environment for providing an online cloud application platform 108 configured to provide a plurality of online cloud-based applications to a user.

FIG. 1 is a block diagram 100 illustrating an example of a network environment for providing an online cloud application platform 108 configured to provide a plurality of online cloud-based applications to a user. In the example shown, a client 102 accesses an online cloud application platform 108, which provides a plurality of online cloud-based applications, such as application services 110A, 110B, and 110C. Online cloud application platform 108 utilizes a database 112 for providing the online cloud-based applications. For example, database 112 may be used for configuring and servicing online cloud application platform 108 for interacting with and navigating the various online cloud-based applications. The configuration data stored in database 112 may be provided by an administrator 104. As shown in the example, client 102, administrator 104, online cloud application platform 108, and database 112 are communicatively connected via network 106. In some embodiments, network 106 is a public network, such as the Internet.

In some embodiments, client 102 is a web client such as a network client with a web browser for accessing web-based services provided by application services 110A, 110B, and 110C. Although only a single client is shown in FIG. 1, client 102 is but one example of a client, and multiple additional clients can exist in the network environment. Similarly, although only a single administrator is shown in FIG. 1, administrator 104 is but one example of an administrator, and multiple additional administrators can exist in the network environment.

Although single instances of some components have been shown to simplify the diagram of FIG. 1, additional instances of any of the components shown in FIG. 1 may also exist. For example, online cloud application platform 108 may include one or more different servers and/or multiple components. Similarly, database 112 may include one or more database servers and may not be directly connected to online cloud application platform 108. For example, database 112 and its components may be replicated and/or distributed across multiple servers and/or components. In some embodiments, application services 110A, 110B, and 110C can each be implemented using one or more different services and may each rely on one or more different external data sources (not shown). In some embodiments, components not shown in FIG. 1 may also exist.

Unifying multiple online applications onto a single online cloud application platform has a number of challenges. In one aspect, online cloud application platform 108 needs to unify the various application services by providing a unified mechanism for receiving an event trigger of a function or feature originating from any of the online cloud-based applications while the client is currently interacting with one of the online cloud-based applications.

In one example, a client 102 has access to N number of online cloud-based applications (e.g., applications #1-#N) via online cloud application platform 108. At a particular time, client 102 is actively working on application #1. During this time, one of the other online cloud-based applications may send an event trigger of a particular function or feature to client 102. For example, application #5 may send an event trigger that there is a new notification for client 102 to inform client 102 that a new ticket has been assigned. Unlike a single application environment, in which the context of an event trigger is known and the event trigger may be handled by the current application, the event trigger for the notification in this case may originate from any of the applications. In addition, unlike a single application environment, in which the event may be handled by a static route configured for the function, the notification in this case does not have a static route associated or coupled with it for opening the correct application and navigating to the correct page or state for accessing the notification. Therefore, improved techniques that enable online cloud application platform 108 to determine the correct application and the correct route to use automatically and dynamically would be desirable.

In another aspect, online cloud application platform 108 needs to unify the various application services by providing a unified view or a unified interface, e.g., a global toolbar, for interacting with and navigating the various online cloud-based applications.

In one example, client 102 has access to N number of online cloud-based applications (e.g., applications #1-#N) via online cloud application platform 108. One problem of having a unified toolbar is that when a user associated with client 102 clicks on an icon on the toolbar that represents a common function or feature (e.g., "Record/Form" or "List") for different applications, there is not a static route coupled with the common function for opening the correct application and navigating to the correct page or state for the particular function. Furthermore, it would be inefficient or impractical to prompt the user to provide a number of inputs, such as the application to open, the data or configuration to use, and the like. Therefore, improved techniques that enable online cloud application platform 108 to determine the correct application or the correct route to use automatically and dynamically would be desirable. The advantage is that the user does not need to specify additional inputs, thereby improving the overall user experience.

In the present application, an online cloud application platform for global navigation of multiple online cloud-based applications is provided. The online cloud application platform is configured to provide a plurality of online cloud-based applications. While providing a current application among the plurality of online cloud-based applications, an event identifying a function request decoupled from a static navigation route is received via a cross-application routing handler. Based on a set of dynamically modifiable configuration data of the online cloud application platform, which application among the plurality of online cloud-based applications to handle the function request is dynamically determined. Based on the set of dynamically modifiable configuration data of the online cloud application platform, a corresponding dynamically determined cross-application navigation route to handle the event is determined. The dynamically determined cross-application navigation route is provided within a context of the current application among the plurality of online cloud-based applications.

The online cloud application platform presented in the present application has many advantages. The platform supports feature-driven navigation in the unified multi-experience environment. The platform provides metadata-driven and feature-based navigation capability and avoids the need for the platform to use static route data. Any global utility that is part of the unified interface may use the techniques disclosed herein to handle the application activation and screen navigation.

Figure 2:
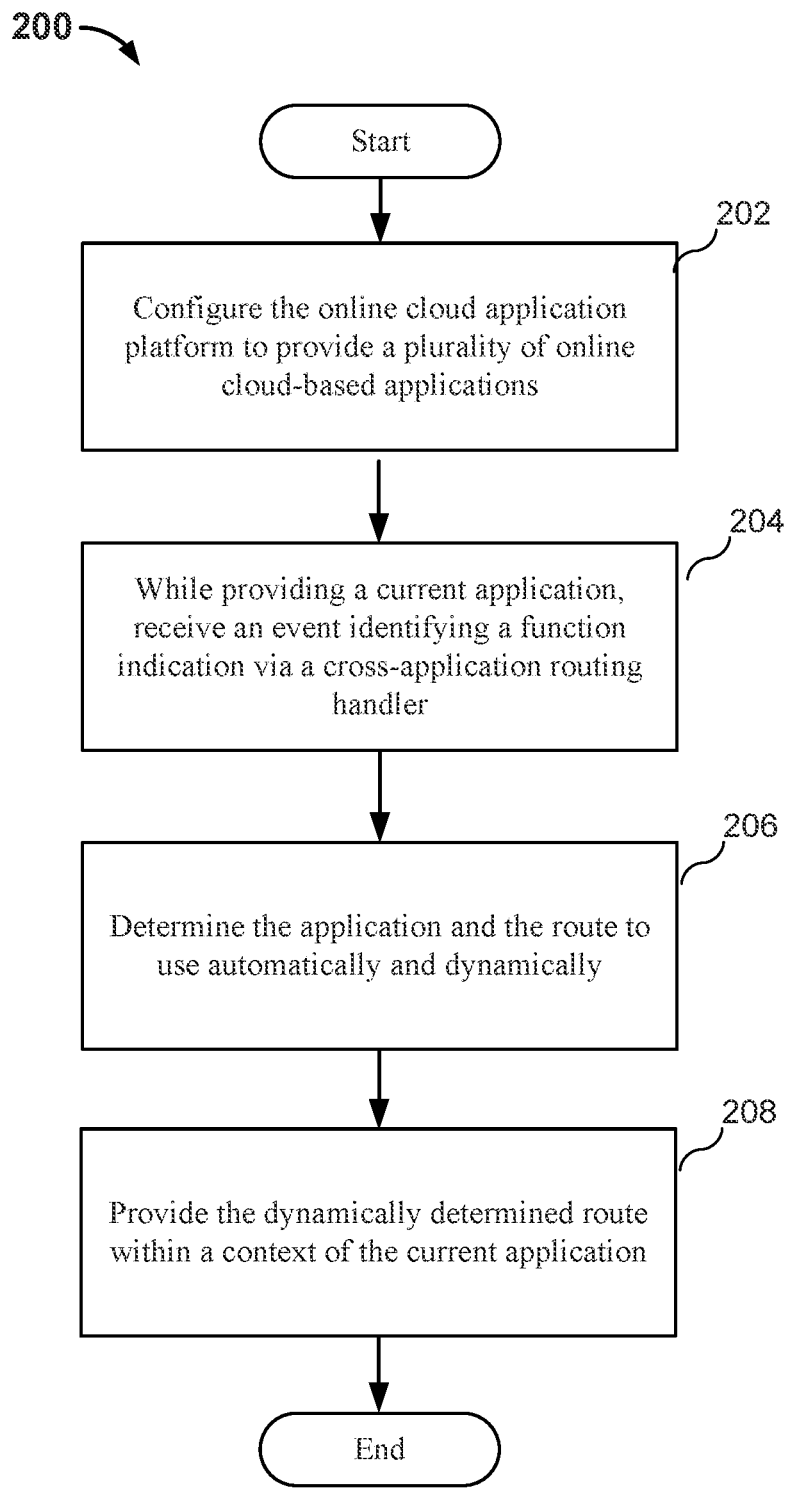
FIG. 2 illustrates an example of a process 200 for an online cloud application platform for global navigation of multiple online cloud-based applications.

FIG. 2 illustrates an example of a process 200 for an online cloud application platform for global navigation of multiple online cloud-based applications. Process 200 may be performed by online cloud application platform 108 in FIG. 1.

At step 202, the online cloud application platform is configured to provide a plurality of online cloud-based applications. Referring back to FIG. 1, block diagram 100 illustrates an example of a network environment for providing an online cloud application platform 108 configured to provide a plurality of online cloud-based applications to a user. In the example shown, a client 102 accesses an online cloud application platform 108, which provides a plurality of online cloud-based applications, such as application services 110A, 110B, and 110C. Online cloud application platform 108 utilizes a database 112 for providing the online cloud-based applications. For example, database 112 may be used for configuring and servicing online cloud application platform 108 for interacting with and navigating the various online cloud-based applications. The configuration data stored in database 112 may be provided by an administrator 104. For example, the configurations may be performed by specifying parameters, filters, rules, access control lists, and the like.

In some embodiments, the configuration data includes data for configuring each of the application services 110A, 110B, and 110C. For each application service, the configuration data may include the type of the application service. The configuration data may include a list of features or functions supported by online cloud application platform 108, and each function has one or more lists of applications that provide that function. In some embodiments, a list of applications that provide a particular function may be arranged in an order based on priority, e.g., decreasing or increasing priority. In some embodiments, there may be multiple lists of applications that provide a particular function, and each list corresponds to a different set of criteria. For each application that provides a particular function, the configuration data includes a route or link. The route may be used for opening the application and navigating to the correct page or state for the particular function.

At step 204, while providing a current application among the plurality of online cloud-based applications, an event identifying a function request decoupled from a static navigation route is received via a cross-application routing handler.

In one example, a client 102 has access to N number of different online cloud-based applications (e.g., applications #1-#N) via online cloud application platform 108. At a particular time, client 102 is actively working on application #1. Application #1 is the current application. During this time, one of the other online cloud-based applications may send an event trigger of a particular function or feature to client 102. For example, application #5 may send an event trigger that there is a new notification for client 102 to inform client 102 that a new ticket has been assigned. The event trigger identifies a function request, which is the notification of a new assigned ticket to client 102.

Unlike a single application environment, in which the context of an event trigger is known and the event trigger may be handled by the current application, the event trigger for the notification in this case may originate from any of the applications. The cross-application event trigger crosses over from one application to another and the cross-application event trigger is received via a cross-application routing handler of online cloud application platform 108.

In addition, unlike a single application environment, in which the event may be handled by a static route configured for the function, the notification in this case does not have a static route associated or coupled with it for opening the correct application and navigating to the correct page or state for accessing the notification. In other words, the function request is decoupled from a static navigation route.

In another aspect, online cloud application platform 108 needs to unify the various application services by providing a unified view or a unified interface, e.g., a global toolbar, for interacting with and navigating the various online cloud-based applications.

In one example, client 102 has access to N number of online cloud-based applications (e.g., applications #1-#N) via online cloud application platform 108. At a particular time, client 102 is actively working on application #1. Application #1 is the current application. During this time, when a user associated with client 102 clicks on an icon on the toolbar that represents a common function or feature (e.g., "Record/form" or "list") for different applications, an event trigger is generated in response to the clicking of the icon on the global toolbar. The event trigger identifies a function request, which is the common function or feature request (e.g., "Record/Form" or "List") represented by the icon on the global toolbar. The function request has the same name but different implementations, i.e., a different set of steps may be performed by two different online cloud-based applications.

Unlike a single application environment, in which the context of an event trigger is known and the event trigger may be handled by the current application, the event trigger for the function in this case may correspond to any of the applications. The cross-application event trigger allows a cross over from one application to another and the cross-application event trigger is received via a cross-application routing handler of online cloud application platform 108.

Having a unified toolbar, when a user associated with client 102 clicks on an icon on the toolbar that represents a common function or feature (e.g., "Record/form" or "list") for different applications, there is not a static route coupled with the common function for opening the correct application and navigating to the correct page or state for the particular function. In other words, the function request is decoupled from a static navigation route.

At step 206, online cloud application platform 108 determines the correct application and the correct route to use automatically and dynamically. Based on a set of dynamically modifiable configuration data of the online cloud application platform, which application among the plurality of online cloud-based applications to handle the function request is dynamically determined. Based on the set of dynamically modifiable configuration data of the online cloud application platform, a corresponding dynamically determined cross-application navigation route to handle the event is determined.

At step 208, the dynamically determined cross-application navigation route is provided within a context of the current application. Within the context of the current application, the cross-application navigation route is used to open the correct application and navigate to the correct page or state for executing the particular function.

Figure 3:
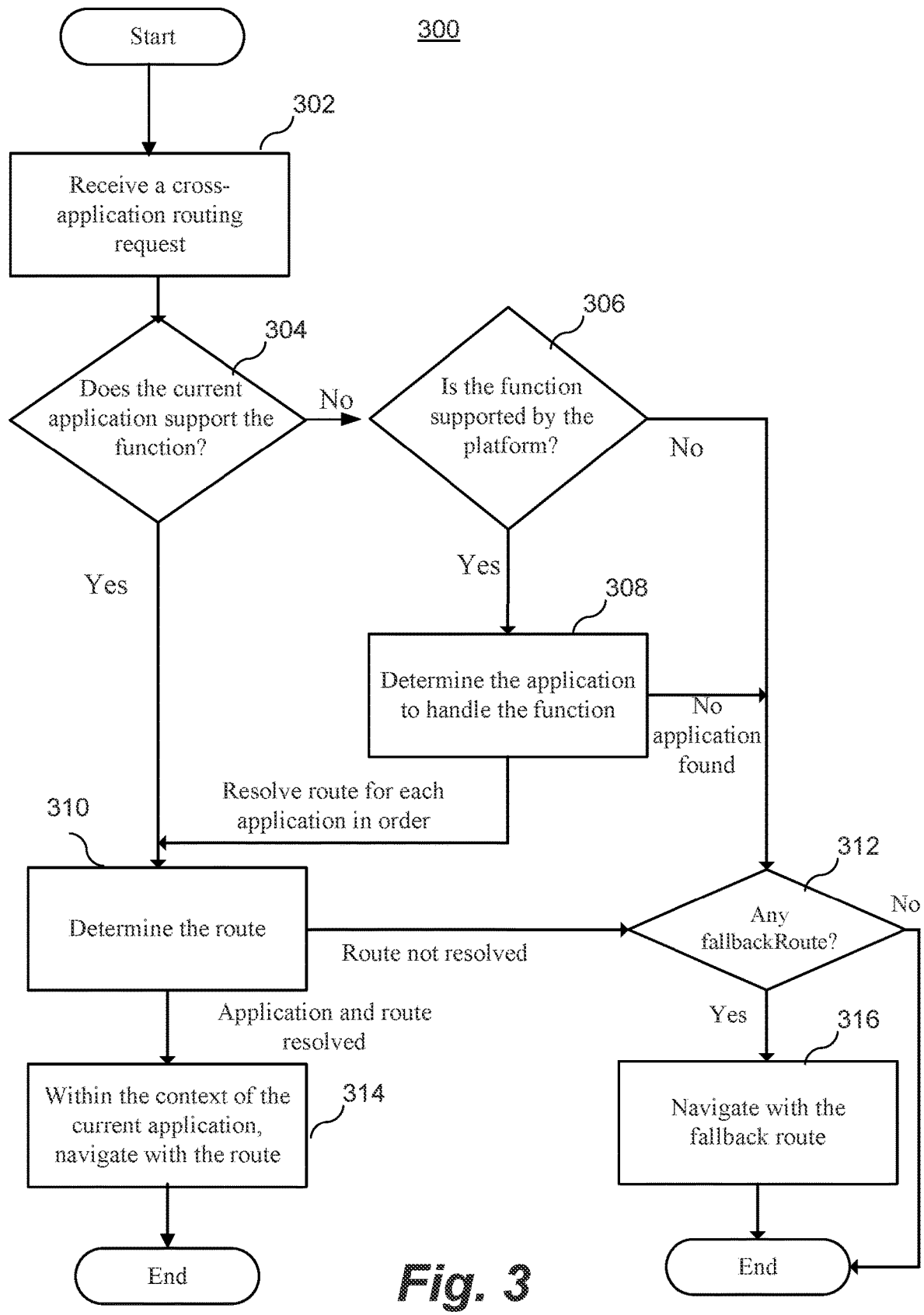
FIG. 3 illustrates an example of a process 300 for determining the correct application and route to use and providing the cross-application navigation route within the context of the current application.

FIG. 3 illustrates an example of a process 300 for determining the correct application and route to use and providing the cross-application navigation route within the context of the current application. In some embodiments, process 300 is performed at step 206 and step 208 of process 200 in FIG. 2.

At step 302, a cross-application routing request is received via the cross-application routing handler. The cross-application routing handler may receive different parameters or metadata, including the function request itself, fields, filters, and a fallback route. A fallback route is a route that may be used when no other route matches with the incoming request in process 300.

At step 304, it is determined whether the current application supports the function. In some embodiments, the determination is based on the data stored in database 112. For example, the configuration data in database 112 may include a list of features or functions supported by online cloud application platform 108, and each function has a list of applications that provide that function. If the current application is found on the list of applications that provide the function, then process 300 proceeds to step 310. In this case, the current application is dynamically determined to handle the function request based on the online cloud application platform's configuration, which is dynamically modifiable by the administrator. If the current application is not found on the list of applications that provide the function, then process 300 proceeds to step 306.

At step 306, it is determined whether the function is supported by online cloud application platform 108. For example, the function may be matched with the list of features or functions in database 112. If the function is supported by at least some of the applications, then process 300 proceeds to step 308. In this case, process 300 proceeds to determine the application to handle the function based on the online cloud application platform's configuration. If the function is not supported by at least some of the applications, then process 300 proceeds to step 312.

At step 308, the application to handle the function request is dynamically resolved. Based on the set of dynamically modifiable configuration data of the online cloud application platform, which application among the plurality of online cloud-based applications to handle the function request is dynamically determined. In some embodiments, the list of applications that provide the function may be arranged in an order based on priority, e.g., decreasing or increasing priority. If an application to handle the function is found, then process 300 proceeds to step 310. If an application to handle the function is not found, then process 300 proceeds to step 312.

At step 310, a cross-application navigation route is dynamically resolved. Based on the set of dynamically modifiable configuration data of the online cloud application platform, a corresponding dynamically determined cross-application navigation route to handle the event is determined. For each application that provides a particular function, the configuration data includes a route or link. The route may be used for opening the application and navigating to the correct page or state for the particular function. If a navigation route to handle the function is found, then process 300 proceeds to step 314. If a navigation route to handle the function is not found, then process 300 proceeds to step 312.

At step 314, the dynamically determined cross-application navigation route is provided within the context of the current application. In particular, within the context of the current application, the cross-application navigation route is used to open the correct application and navigate to the correct page or state for the particular function. Process 300 then exits.

Process 300 may proceed to step 312 for one of the reasons: 1) the function is not supported by at least some of the applications at step 306; 2) an application to handle the function is not found at 308; and 3) a navigation route to handle the function is not found at 310. At step 312, it is determined whether there is a fallback route. A fallback route is a route that may be used when no other route matches the incoming request in process 300. If there is a fallback route, then process 300 proceeds to step 316. If there is not a fallback route, then process 300 exits.

At step 316, the fallback navigation route is provided within the context of the current application. In particular, within the context of the current application, the fallback navigation route is used to open the correct application and navigate to the selected page or state for the particular function. Process 300 then exits.

Figure 4:
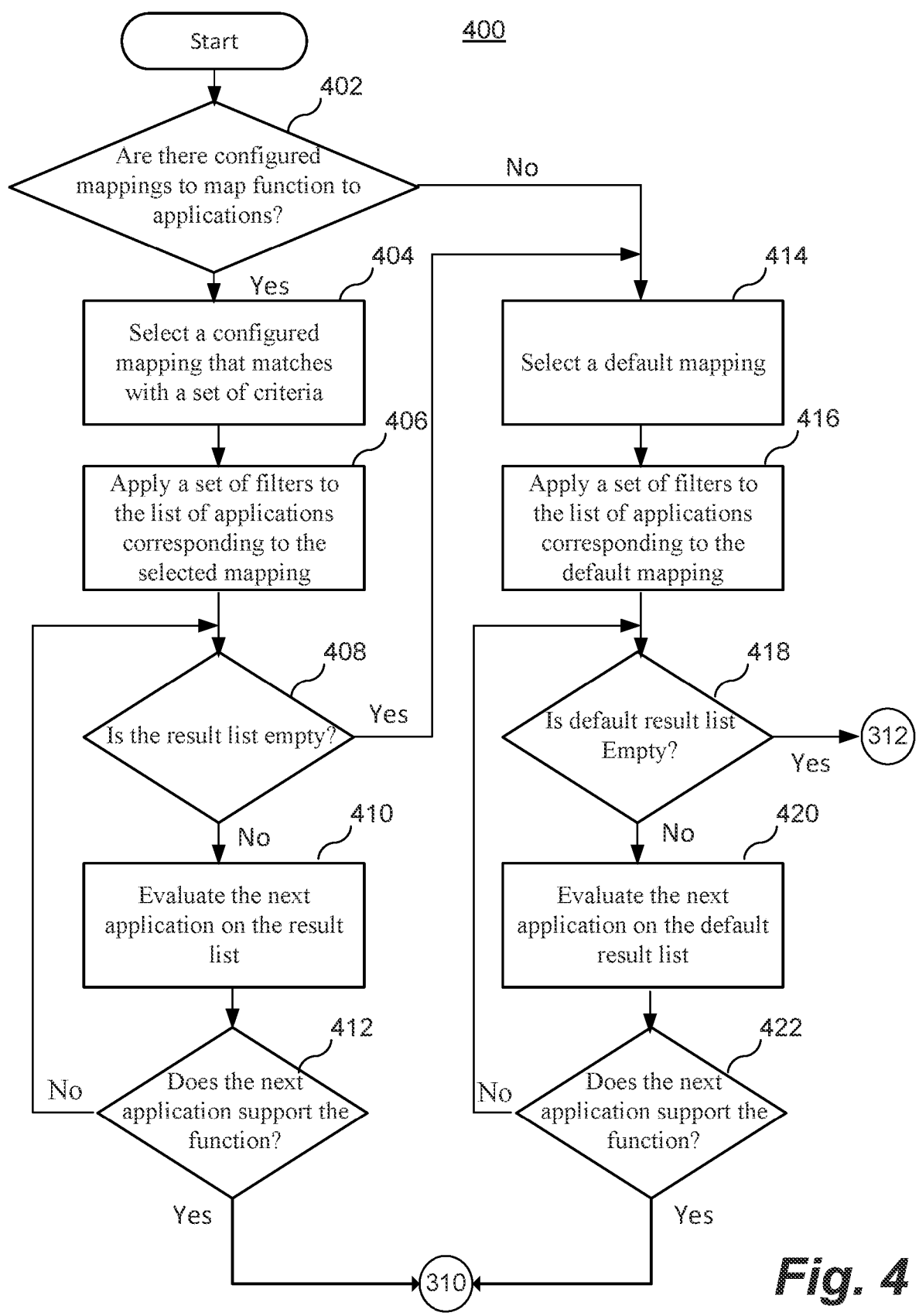
FIG. 4 illustrates an example of a process 400 for determining the application to open in response to an event trigger identifying a function request.

FIG. 4 illustrates an example of a process 400 for determining the application to open in response to an event trigger identifying a function request. In some embodiments, process 400 may be performed at step 308 of process 300.

At step 402, it is determined whether there are any configured mappings to map the function to a list of applications based on a set of criteria. For example, the configurations may include multiple mappings. Each mapping includes a list of applications that provide the particular function, and each mapping corresponds to a different set of criteria. If there is at least one configured mapping, then process 400 proceeds to 404. If there are no configured mappings, then process 400 proceeds to 414.

At step 404, one of the configured mappings that matches with the set of criteria is selected. At step 406, a set of filters is applied to the list of applications corresponding to the selected mapping. The result from step 406 is a result list of applications that are candidate applications to select from.

At step 408, it is determined whether the result list of applications is empty. If the result list is empty, then process 400 proceeds to step 414. If the result list is not empty, then the next application on the result list is evaluated at step 410. At step 412, it is determined whether the next application on the result list supports the function. If the function is supported, then process 400 proceeds to step 310 of process 300. If the function is not supported, then process 400 returns back to step 408.

Process 400 may proceed to step 414 for one of the following reasons: 1) There are no configured mappings at step 402; and 2) the result list is empty at step 408. At step 414, a default mapping is selected. At step 416, a set of filters is applied to the list of applications corresponding to the default mapping. The result from step 416 is a default result list of applications that are candidate applications to select from.

At step 418, it is determined whether the default result list of applications is empty. If the default result list is empty, then process 400 proceeds to step 312 of process 300. If the default result list is not empty, then the next application on the default result list is evaluated at step 420. At step 422, it is determined whether the next application on the default result list supports the function. If the function is supported, then process 400 proceeds to step 310 of process 300. If the function is not supported, then process 400 returns back to step 418.

Figure 5:
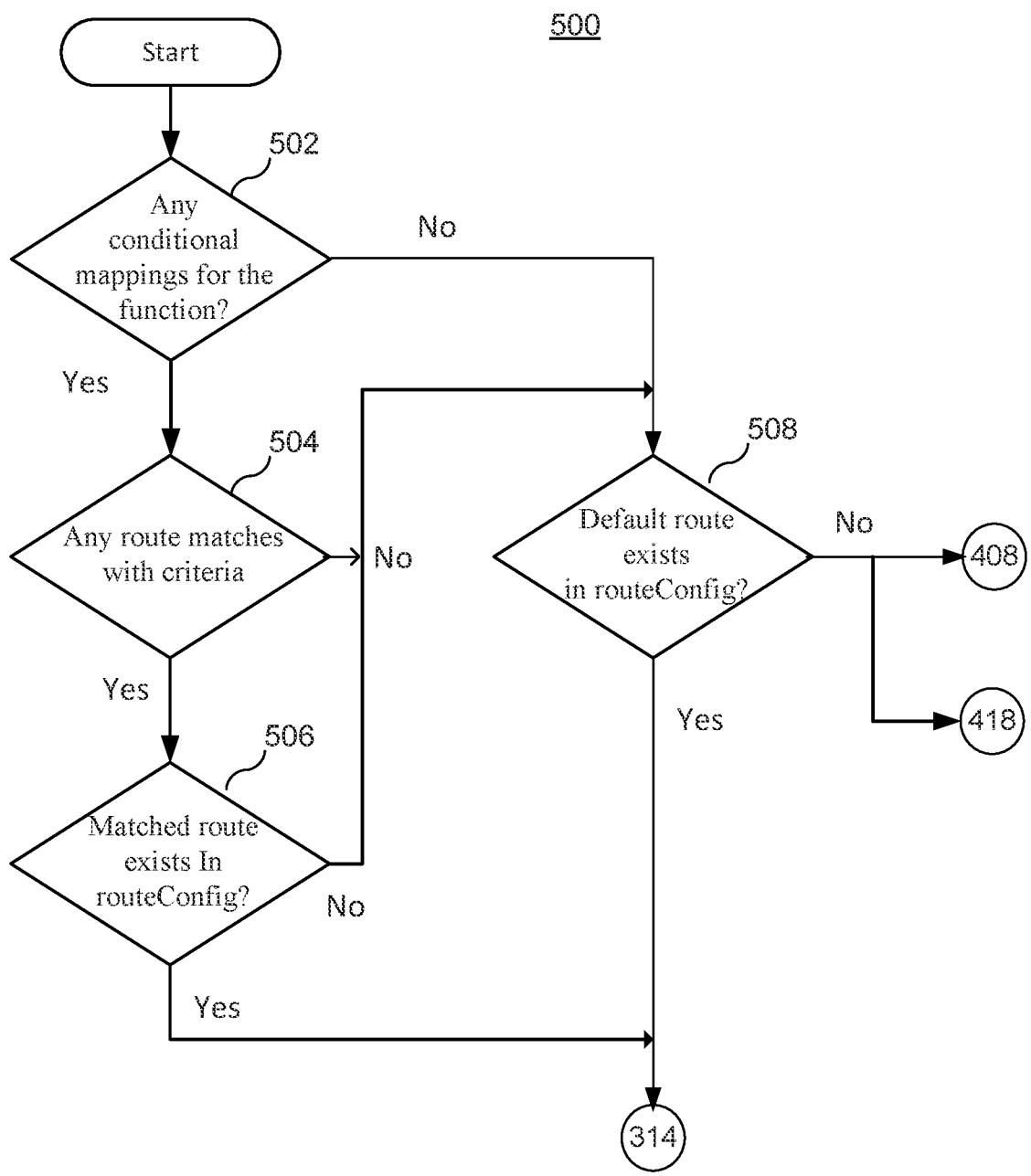
FIG. 5 illustrates an example of a process 500 for determining a cross-application navigation route.

FIG. 5 illustrates an example of a process 500 for determining a cross-application navigation route. In some embodiments, process 500 may be performed at step 310 of process 300.

At step 502, it is determined whether there are any configured conditional mappings to map the function to a list of routes based on a set of criteria. If there is at least one configured mapping, then process 500 proceeds to step 504. Otherwise, process 500 proceeds to step 508.

At step 504, it is determined whether there is any route that matches with a set of criteria. If there is a route that matches with the set of criteria, then process 500 proceeds to step 506. Otherwise, process 500 proceeds to step 508.

At step 506, it is determined whether the matched route exists in routeConfig. If the matched route exists in routeConfig, then process 500 proceeds to step 314 of process 300. If the matched route does not exist in routeConfig, then process 500 proceeds to step 508.

At step 508, it is determined whether there is a default route that exists in routeConfig. If there is a default route, then process 500 proceeds to step 314 of process 300. If there is not a default route, then process 500 proceeds to step 408 or step 418 of process 400.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
providing an online cloud application platform configured to provide a plurality of online cloud-based applications;
while providing a current application among the plurality of online cloud-based applications, receiving via a cross-application routing handler an event identifying a function request common to more than one application among the plurality of online cloud-based applications, wherein the event is decoupled from a static navigation route for opening a predetermined application of the plurality of online cloud-based applications to handle the function request;
receiving a set of dynamically modifiable configuration data that includes a list of functions supported by the online cloud application platform and a list of applications that provide the function corresponding to the function request, and wherein one of the functions in the list of functions is a function corresponding to the function request;
based on the set of dynamically modifiable configuration data of the online cloud application platform, dynamically determining which selected application among the plurality of online cloud-based applications to handle the function request including by determining a corresponding dynamically determined cross-application navigation route for opening the selected application to handle the function request, wherein the cross-application navigation route is included in the set of dynamically modifiable configuration data; and
providing the dynamically determined cross-application navigation route within a context of the current application among the plurality of online cloud-based applications.

2. The method of claim 1, wherein each of the one or more lists of applications that provide the function corresponding to the function request is arranged in an order based on priority.

3. The method of claim 1, wherein each of the one or more lists of applications that provide the function corresponding to the function request correspond to a different set of criteria.

4. The method of claim 1, further comprising: within the context of the current application, using the cross-application navigation route to open the selected application and navigate to a page for executing the function corresponding to the function request.

5. The method of claim 1, wherein the function request comprises a notification originated from the selected application.

6. The method of claim 1, wherein the function request is made in response to a user input from a unified toolbar for interacting with and navigating the plurality of online cloud-based applications.

7. The method of claim 6, wherein the function request has a same name, and wherein a first online cloud-based application and a second online cloud-based application perform different sets of steps in response to the function request.

8. A system, comprising:
one or more processors; and
a memory coupled to the one or more processors, wherein the memory is configured to provide the one or more processors with instructions which when executed cause the one or more processors to:
provide an online cloud application platform configured to provide a plurality of online cloud-based applications;
while providing a current application among the plurality of online cloud-based applications, receive via a cross-application routing handler an event identifying a function request common to more than one application among the plurality of online cloud-based applications, wherein the event is decoupled from a static navigation route for opening a predetermined application of the plurality of online cloud-based applications to handle the function request;
receive a set of dynamically modifiable configuration data that includes a list of functions supported by the online cloud application platform and a list of applications that provide the function corresponding to the function request, and wherein one of the functions in the list of functions is a function corresponding to the function request;
based on the set of dynamically modifiable configuration data of the online cloud application platform, dynamically determining which selected application among the plurality of online cloud-based applications to handle the function request including by determining a corresponding dynamically determined cross-application navigation route for opening the selected application to handle the function request, wherein the cross-application navigation route is included in the set of dynamically modifiable configuration data; and
provide the dynamically determined cross-application navigation route within a context of the current application among the plurality of online cloud-based applications.

9. The system of claim 8, wherein each of the one or more lists of applications that provide the function corresponding to the function request is arranged in an order based on priority.

10. The system of claim 8, wherein each of the one or more lists of applications that provide the function corresponding to the function request correspond to a different set of criteria.

11. The system of claim 8, wherein the memory is further configured to provide the one or more processors with instructions which when executed cause the one or more processors to: within the context of the current application, use the cross-application navigation route to open the selected application and navigate to a page for executing the function corresponding to the function request.

12. The system of claim 8, wherein the function request comprises a notification originated from the selected application.

13. The system of claim 8, wherein the function request is made in response to a user input from a unified toolbar for interacting with and navigating the plurality of online cloud-based applications.

14. The system of claim 13, wherein the function request has a same name, and wherein a first online cloud-based application and a second online cloud-based application perform different sets of steps in response to the function request.

15. A computer program product, the computer program product being embodied in a non-transitory computer readable storage medium and comprising computer instructions for:
providing an online cloud application platform configured to provide a plurality of online cloud-based applications;
while providing a current application among the plurality of online cloud-based applications, receiving via a cross-application routing handler an event identifying a function request common to more than one application among the plurality of online cloud-based applications, wherein the event is decoupled from a static navigation route for opening a predetermined application of the plurality of online cloud-based applications to handle the function request;
receive a set of dynamically modifiable configuration data that includes a list of functions supported by the online cloud application platform and a list of applications that provide the function corresponding to the function request, and wherein one of the functions in the list of functions is a function corresponding to the function request;
based on the set of dynamically modifiable configuration data of the online cloud application platform, dynamically determining which selected application among the plurality of online cloud-based applications to handle the function request including by determining a corresponding dynamically determined cross-application navigation route for opening the selected application to handle the function request, wherein the cross-application navigation route is included in the set of dynamically modifiable configuration data; and
providing the dynamically determined cross-application navigation route within a context of the current application among the plurality of online cloud-based applications.

16. The computer program product of claim 15, further comprising the computer instructions for: within the context of the current application, using the cross-application navigation route to open the selected application and navigate to a page for executing the function corresponding to the function request.

17. The computer program product of claim 15, wherein the function request is made in response to a user input from a unified toolbar for interacting with and navigating the plurality of online cloud-based applications.

* * * * *